A. ZANOLLI.
FOLDING BASKET.
APPLICATION FILED JULY 7, 1913.

1,089,686.

Patented Mar. 10, 1914.

2 SHEETS—SHEET 1.

WITNESSES:
Paul M. Critchlow
Francis J. Tomasson

INVENTOR
Angelo Zanolli
by Christy and Christy
Atty's

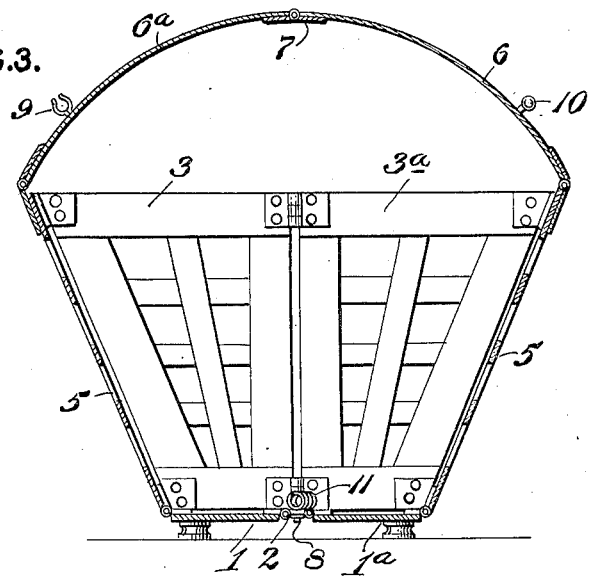
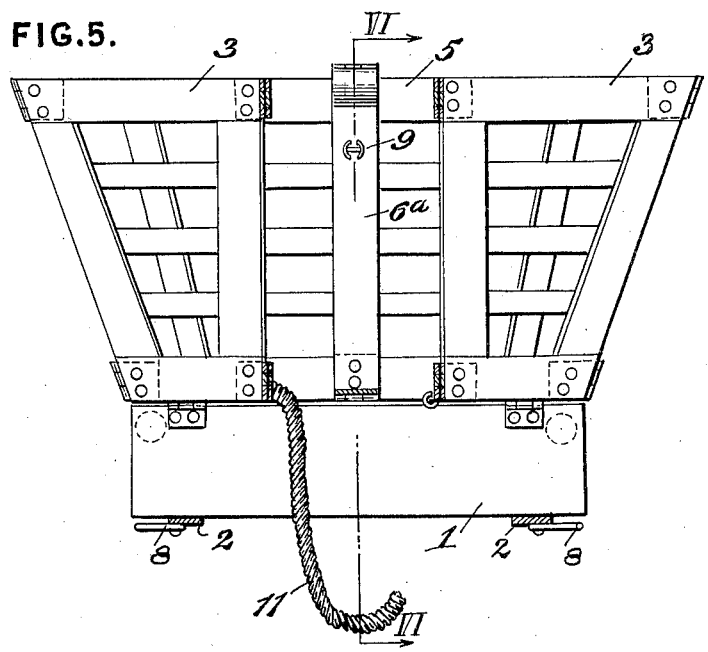
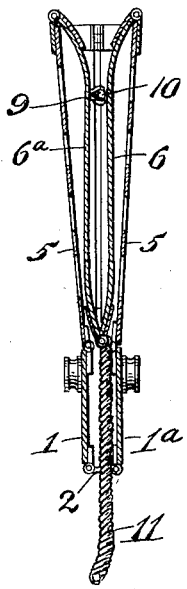

UNITED STATES PATENT OFFICE.

ANGELO ZANOLLI, OF PITTSBURGH, PENNSYLVANIA.

FOLDING BASKET.

1,089,686.   Specification of Letters Patent.   Patented Mar. 10, 1914.

Application filed July 7, 1913. Serial No. 777,655.

*To all whom it may concern:*

Be it known that I, ANGELO ZANOLLI, residing at Pittsburgh, in the county of Allegheny and State of Pennsylvania, a subject of Italy, have invented or discovered certain new and useful Improvements in Folding Baskets, of which improvement the following is a specification.

The object of my invention is to provide a basket which will be rigid and serviceable for carrying parcels, but which may be easily folded into a compact flat form, when not in use.

Figure 1:
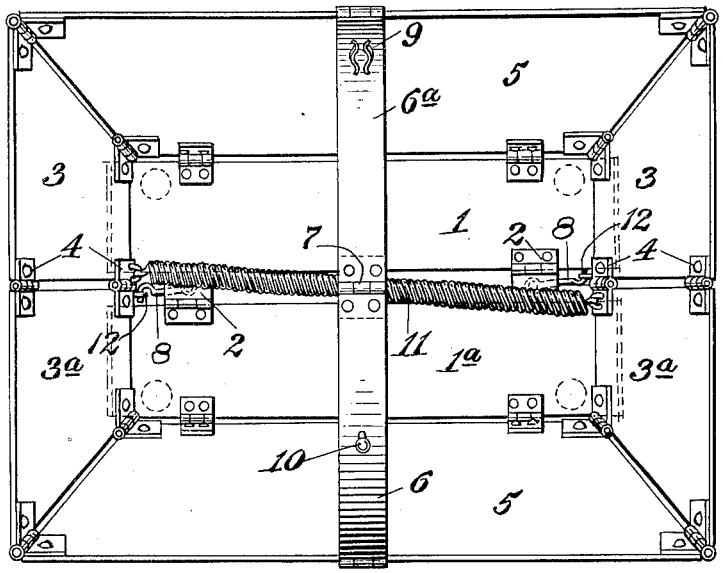
Figure 2:
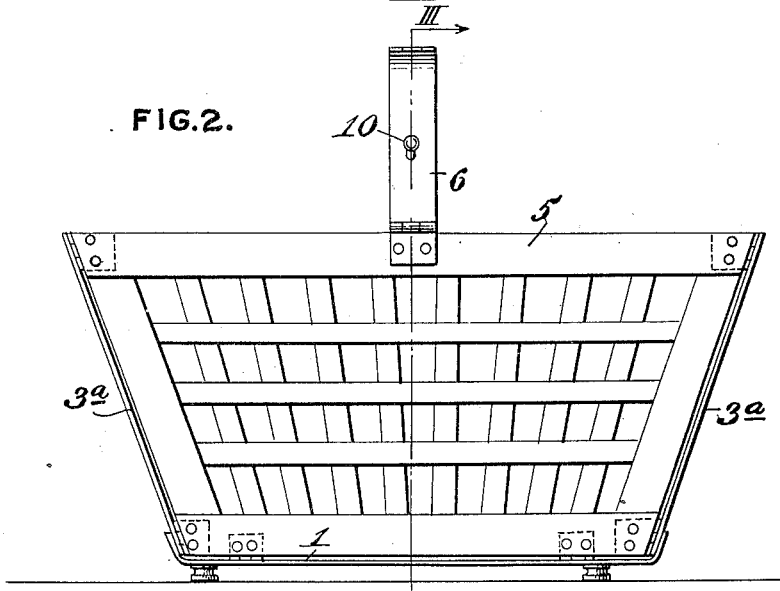
Figure 4:
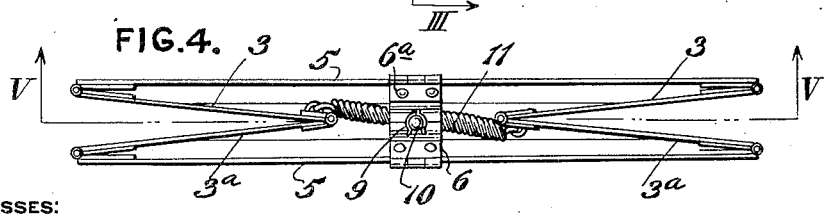

In the accompanying drawings, which form part of my specification, I have illustrated one embodiment of my invention. Figures 1 and 2 are respectively top plan view and side elevation of the basket opened out ready for use; Fig. 3 is a sectional elevation of the basket taken on the line III—III, Fig. 2; Fig. 4 is a top plan view of the basket when folded; Fig. 5 is a sectional view taken on the line V—V, Fig. 4; and Fig. 6 is a sectional view taken on the line VI—VI, Fig. 5.

In the several figures like numerals are used to designate like parts.

While, in the illustrative embodiment of my invention, the sides and ends of the basket are shown diverging outwardly from the bottom, and the parts shown as constructed of an open mesh basket material, it will be understood that the basket may be made in any desired shape and of various materials.

Referring to the drawings, and particularly to Figs. 1, 2 and 3, the bottom of the basket is formed of two parts 1 and 1$^a$, hinged together at the center preferably by means of double hinges 2, which permit the two parts to swing downwardly when the basket is folded, and which also leave an open elongate space between them. The ends are also each formed of two parts 3 and 3$^a$ hinged together at the center by hinges 4 in such a manner that the end parts may fold inwardly between the sides 5, which are each formed of a single piece, hinged both to the bottom 1, 1$^a$ and to the ends 3, 3$^a$ as clearly shown.

The handle of the basket is formed of two strips 6 and 6$^a$ of spring like material, preferably metal. Each strip is hinged to a side 5 in such a manner that it may turn downwardly between the sides; and the two strips are hinged together at the center of the basket by means of a hinge 7 adapted to prevent the strip from opening outwardly beyond the position indicated in Fig. 3. By such an arrangement the handle 6, 6$^a$ effectively holds the sides 5 yieldingly in open-basket position, and materially strengthens the entire construction. The further means which I employ for holding the basket rigid when open comprise hooks 8, secured preferably to the intermediate portion of the double hinges 2, and eyes 12 attached to the right end portion 3 and left end portion 3$^a$, as viewed in Fig. 1.

Extending between and attached to the central part of the opposite end portions 3 and 3$^a$, I provide a closely coiled flexible spring 11, the length thereof being such that when the basket is opened a slight tension will be exerted upon its two-part ends at the point where they are hinged together. The arrangement in this regard is such that, when the hooks 8 are released, the ends 3, 3$^a$ will, through the tension of the coil 11, be swung inwardly. When the basket is folded the coil 11 extends through the opening between the bottom portions 1, 1$^a$ and forms a suitable handle whereby the basket may be carried in inverted position.

In order to fold the basket the hooks 8 are released from the eyes 12 and the handle 6, 6$^a$ is sprung downwardly, spreading the sides outwardly until the hinge 7 falls below the general plane of the top of the basket. The coil 11 then becomes effective to swing the ends 3, 3$^a$ slightly toward the center of the basket so that the completed folding thereof may be effected by pressing the sides 5 together, the folded position being clearly indicated in Figs. 4, 5 and 6 of the drawings. To the end that the basket may be held in collapsed position the handle strip 6$^a$ is provided with a spring clip 9 adapted to receive and yieldingly engage a knob 10 attached to the handle strip 6.

I claim as my invention:

1. In a folding basket, the combination of oppositely disposed sides, a bottom formed of two pieces each being hinged to the lower edge of a side and hinged together centrally of the basket, oppositely disposed ends each formed of two pieces hinged together centrally of the basket, each piece of said ends being hinged to an end of said sides, means for locking said several parts in open position, and a single means for swinging said ends between said sides when said locking means are released and for carrying the basket when folded.

2. In a folding basket, the combination of oppositely disposed sides, a bottom formed of two pieces each being hinged to the lower edge of a side and hinged together centrally of the basket with an intervening space, oppositely disposed ends each formed of two pieces hinged together centrally of the basket, each piece of said ends being hinged to an end of said sides, means for locking said several parts in open position, and a coiled flexible spring secured at its opposite ends to the central portion of said basket ends and exerting a tension thereon when the basket is open, said spring adapted to extend through the intervening space between said bottom pieces and thus form a handle for the basket when folded.

3. In a folding basket, the combination of oppositely disposed sides, a bottom formed of two pieces each being hinged to the lower edge of a side and hinged together centrally of the basket, oppositely disposed ends each formed of two pieces hinged together centrally of the basket, each piece of said ends being hinged to an end of said sides, and a handle formed of two yielding strips hinged together at the central portion of the basket and each hinged to a side, said handle being adapted when the basket is open to exert a yielding outward pressure upon the sides thereof.

4. In a folding basket, the combination of oppositely disposed single-piece sides, a bottom formed of two pieces each being hinged to the lower edge of a side and hinged together centrally of the basket, oppositely disposed ends each formed of two pieces hinged together centrally of the basket, each piece of said ends being hinged to an end of said sides, means for locking said several parts in position, a coiled flexible spring attached at its opposite ends to the central portion of said basket ends and exerting a tension thereon when the basket is open, a handle formed of two yielding strips hinged together at the central portion of the basket and each hinged to a side, said handle being adapted when the basket is open to exert a yielding outward pressure upon the sides thereof, and means borne by said handle parts for locking the basket in closed position.

In testimony whereof I have hereunto set my hand.

ANGELO ZANOLLI.

Witnesses:
PETER BARONI,
FRANCIS J. TOMASSON.

Copies of this patent may be obtained for five cents each, by addressing the "Commissioner of Patents, Washington, D. C."